(12) United States Patent
Limburg et al.

(10) Patent No.: US 11,120,553 B2
(45) Date of Patent: Sep. 14, 2021

(54) METHODS AND DEVICES FOR PERFORMING AN ANALYTICAL MEASUREMENT

(71) Applicant: Roche Diabetes Care, Inc., Indianapolis, IN (US)

(72) Inventors: Bernd Limburg, Mannheim (DE); Max Berg, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 0 days.

(21) Appl. No.: 16/852,027

(22) Filed: Apr. 17, 2020

(65) Prior Publication Data

US 2020/0242769 A1 Jul. 30, 2020

Related U.S. Application Data

(63) Continuation of application No. PCT/EP2018/079079, filed on Oct. 24, 2018.

(30) Foreign Application Priority Data

Oct. 25, 2017 (EP) ..................................... 17198287

(51) Int. Cl.
*H04N 7/18* (2006.01)
*G06T 7/00* (2017.01)
(Continued)

(52) U.S. Cl.
CPC ........... *G06T 7/0014* (2013.01); *G01N 21/78* (2013.01); *G01N 21/8483* (2013.01); *G06T 7/90* (2017.01);
(Continued)

(58) Field of Classification Search
CPC ..................... G06T 7/0014; G06T 7/90; G06T 2207/10024; G06T 2207/30168;
(Continued)

(56) References Cited

U.S. PATENT DOCUMENTS 8,145,431 B2 * 3/2012 Kloepfer ................ G01N 33/92
702/19
8,345,249 B2 * 1/2013 Kurokawa ........... G01N 33/558
356/436

(Continued)

FOREIGN PATENT DOCUMENTS

EP 0 864 858 A2 9/1998
EP 1 801 568 A1 6/2007
(Continued)

OTHER PUBLICATIONS

International Search Report and Written Opinion of the International Searching Authority, PCT/EP2018/079079, dated Mar. 11, 2019, 14 pages.

(Continued)

*Primary Examiner* — Trang U Tran
(74) *Attorney, Agent, or Firm* — Bose McKinney & Evans LLP

(57) ABSTRACT

A method for evaluating the suitability of a mobile device having a camera for performing an analytical measurement is disclosed. The method includes providing the mobile device and providing a reference object having a predefined spatial extension in a spatial dimension. An image is taken of at least part of the reference object using the camera and is used to derive spatial resolution information that includes one or more numerical values that quantify the capability of the camera to resolve two or more objects in the image. A threshold value based on a minimum number of pixels in the spatial dimension within a region of interest in the image is provided and the spatial resolution information is compared (Continued)

with the threshold value. It is determined from the comparison whether the mobile device is suitable for performing the analytical measurement.

14 Claims, 4 Drawing Sheets

(51) Int. Cl.
 *G06T 7/90* (2017.01)
 *G01N 21/78* (2006.01)
 *G01N 21/84* (2006.01)
 *H04N 5/232* (2006.01)
 *H04N 17/00* (2006.01)

(52) U.S. Cl.
 CPC ....... *H04N 5/23222* (2013.01); *H04N 17/002* (2013.01); *G01N 2201/0221* (2013.01); *G06T 2207/10024* (2013.01); *G06T 2207/30168* (2013.01)

(58) Field of Classification Search
 CPC .... H04N 5/23222; H04N 17/002; H04N 7/18; H04N 5/232; H04N 17/00; G01N 21/78; G01N 21/8483; G01N 2201/0221
 USPC .......................................................... 348/135
 See application file for complete search history.

(56) References Cited

U.S. PATENT DOCUMENTS

| | | | |
|---|---|---|---|
| 9,903,857 B2* | 2/2018 | Polwart | ............ G01N 33/56911 |
| 2014/0080129 A1 | 3/2014 | Klunder et al. | |
| 2015/0308961 A1 | 10/2015 | Burg et al. | |
| 2016/0153912 A1 | 6/2016 | Dickopf | |

FOREIGN PATENT DOCUMENTS

| | | |
|---|---|---|
| EP | 1 963 828 B1 | 3/2010 |
| WO | WO 02/13136 A2 | 2/2002 |
| WO | WO 2012/131386 A1 | 10/2012 |
| WO | WO 2014/025415 A2 | 2/2014 |
| WO | WO 2014/057159 A1 | 4/2014 |

OTHER PUBLICATIONS

International Preliminary Report on Patentability, PCT/EP2018/079079, dated Mar. 6, 2020, 9 pages.

Hönes et al., Diabetes Technology and Therapeutics, vol. 10, Supplement 1, 2008, pp. 10-26.

Wang et al., Simple and Effective Method to Quantify the Optical Performance of Camera Phones, Proceedings of SPIE, Jan. 2005, vol. 5668, 7 pages.

* cited by examiner

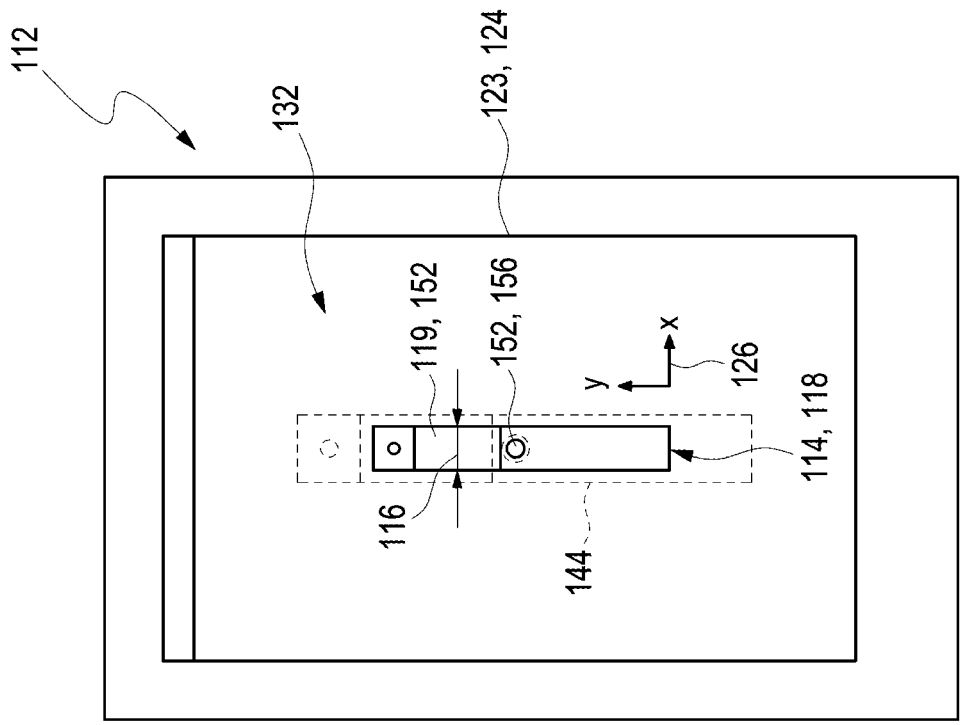
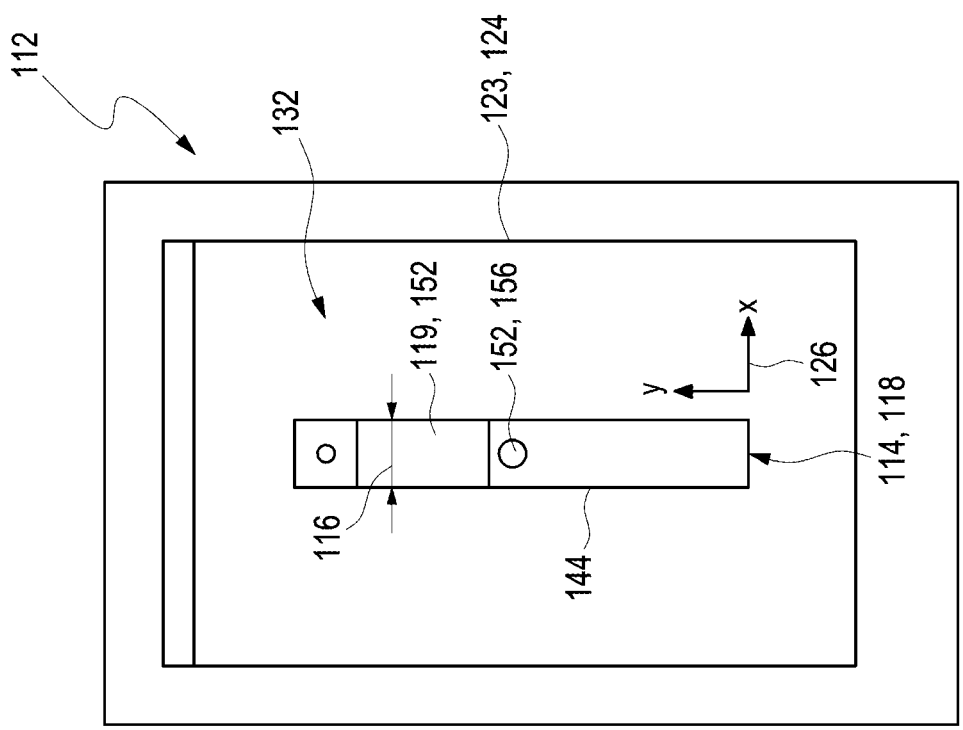

METHODS AND DEVICES FOR PERFORMING AN ANALYTICAL MEASUREMENT

RELATED APPLICATIONS

This application is a continuation of PCT/EP2018/079079, filed Oct. 24, 2018, which claims priority to EP 17 198 287.9, filed Oct. 25, 2017, both of which are hereby incorporated herein by reference.

BACKGROUND

This disclosure generally relates to a method for evaluating the suitability of a mobile device for performing an analytical measurement, the mobile device having at least one camera. This disclosure further relates to a method for performing an analytical measurement, to a computer program and to a mobile device for performing an analytical measurement, as well as to a kit for performing an analytical measurement. Such methods, devices or applications are used in particular for determining blood glucose concentration. In principle, however, alternatively or additionally, determination of one or more other kinds of analytes is also possible, in particular determination of one or more metabolites.

A number of different devices and methods for determining one or more analytes in body fluids, e.g., blood, urine, interstitial fluid and saliva, are known from prior art. Without narrowing the scope, this disclosure specifically will be described with respect to blood glucose measurements. It shall be noted, however, that this disclosure may also be used for other types of analytical measurements using test elements.

Several test element are known in the art which comprise at least one test chemical, also referred to as a test reagent, which undergo a coloration reaction in the presence of the at least one analyte to be detected. Some basic principles on test elements and reagents that may also be used within the scope of this disclosure are described, e.g., in J. Hönes et al.: Diabetes Technology and Therapeutics, Vol. 10, Supplement 1, 2008, pp. 10-26.

In analytical measurements, specifically analytical measurements based on color formation reactions, one technical challenge resides in the evaluation of the color change which is due to the detection reaction. Besides using dedicated analytical devices, such as handheld blood glucose meters, the use of generally available electronics such as smart phones and portable computers has become more and more popular over recent years.

WO 2012/131386 A1 discloses a testing apparatus for performing an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

WO 2014/025415A2 discloses a method and device for performing color-based reaction testing of biological materials. The method includes capturing and interpreting digital images of an unexposed and later exposed instrument within an automatically calibrated environment. The instrument includes a Unique Identification (UID) label, Reference Color Bar (RCB) providing samples of standardized colors for image color calibration, and several testspecific sequences of Chemical Test Pads (CTP). The method further includes locating the instrument in the image, extracting the UID, extracting the RCB, and locating the plurality of CTP in each image. The method further reduces image noise in the CTP and calibrates the image automatically according to lighting measurements performed on the RCB. The method further determines test results by comparing the color of the CTP image to colors in a Manufacturer Interpretation Color Chart (MICC). The method shows these results in graphical or quantified mode.

EP 1801568 A1 discloses a test strip and method for measuring analyte concentration in a biological fluid sample. The method involves positioning a camera at a test strip for pictorially detecting a color indicator and a reference color area. A measured value is determined for the relative position between the camera and the strip and compared with a desired value area. The camera is moved to reduce deflection relative to the strip during the deflection between the measured value and the desired value. An image area assigned to the indicator is localized in a colored image that is detected by the camera. An analyte concentration is determined in a sample by a comparison value.

EP 1963828 B1 discloses a method for measurement of the concentration of at least one analyte which is contained in a sample of a biological fluid, a) wherein a test strip is prepared, which has at least one test point, at least one time indicator and at least one reference color range which comprises the color white and/or a color scale, b) wherein the fluid sample is brought into contact with the test point and the time indicator, c) wherein a color indicator is arranged at the test point as a function of the concentration of the analyte, d) wherein the color of the time indicator is changed as a function of the time duration for which the fluid has been brought into contact with the test point and independently of the concentration of the at least one analyte, e) wherein a camera is positioned on the test strip, f) wherein at least one measured value for the relative position between the camera and the test strip is determined, and is compared with a nominal value range, g) wherein, if there is a discrepancy between the measured value and the nominal value range, the camera is moved relative to the test strip in order to reduce the discrepancy, and steps f) and g) are repeated, h) wherein the camera is used to record a color image on which at least the color indicator, the time indicator and the reference color range are imaged, j) wherein the image areas which are associated with the color indicator, the time indicator and the reference color range are localized in the color image, and the color values of these image areas are determined, k) wherein the time duration between the fluid sample being brought into contact with the test point and the recording of the color image is determined on the basis of the color value determined for the time indicator, with the aid of predetermined reference values, and l) wherein the analyte concentration in the sample is determined on the basis of the color values determined for the color indicator and the reference color range and on the basis of the time duration, with the aid of predetermined comparison values.

U.S. Publication No. 2014/0080129 A1 discloses incorporating the camera from a mobile device (phone, iPad, etc.) to capture an image from a chemical test kit and process the image to provide chemical information. Further, a simple user interface enabling the automatic evaluation of the image, data entry, gps info, and maintaining records from previous analyses, is disclosed.

The aim of the invention disclosed in WO 2014/057159 A1 is to be able to measure, for example, a reagent strip, by means of a single device comprising a digital image-capturing camera used to capture the image of the reagent strip, and subsequently, following a comparative measurement using reference colors provided in a database of data associated with the user's mobile telephone and using a program or internal software thereof, obtaining a concrete color measurement in relation to the images of the data base corresponding to the colors. Said system enables a user to detect glucose in the blood, for example, using a mobile telephone comprising the program in question and the data base, without requiring additional elements.

WO 2014/025415 A2 discloses a method and device for performing color-based reaction testing of biological materials. The method includes capturing and interpreting digital images of an unexposed and later exposed instrument within an automatically calibrated environment. The instrument includes a Unique Identification (UID) label, Reference Color Bar (RCB) providing samples of standardized colors for image color calibration, and several testspecific sequences of Chemical Test Pads (CTP). The method further includes locating the instrument in the image, extracting the UID, extracting the RCB, and locating the plurality of CTP in each image. The method further reduces image noise in the CTP and calibrates the image automatically according to lighting measurements performed on the RCB. The method further determines test results by comparing the color of the CTP image to colors in a Manufacturer Interpretation Color Chart (MICC). The method shows these results in graphical or quantified mode.

WO 02/13136 A2 discloses a method for matching a color of a target surface involving capturing a digital image of the target surface and a test card having a pattern of color fields, each color field having a known true color. The digital image is analyzed to determine the captured target color and the captured colors of the test card color fields. A correction model accounting for ambient lighting conditions and distortions due to the image capturing device is computed from the captured and known colors of the test card color fields. The correction model is applied to the captured target color and the resulting estimated true target color is compared to a database of true product colors to determine a nearest matching product color.

Despite the advantages involved in using consumer-electronics having a camera for the purpose of evaluating analytical measurements, several technical challenges remain. Thus, even though online calibration method by using test elements having reference color bars are generally known, e.g., from WO 2014/025415A2, the accuracy of the analytical measurement generally depends on a large number of technical factors which, so far, are neglected when evaluating the measurements. Specifically, a huge number of mobile devices having cameras is available on the market, all having different technical and optical properties which have to be considered for the analytical measurement. Some of the mobile devices, even though being capable of capturing images of a test element, may not even be suited for analytical measurements, at all. Further challenges reside in the fact that online calibration measurements are rather complex and time-consuming. Processing time and processing resources, however, specifically are critical, specifically when performing measurements with handheld devices. Further technical challenges reside in the fact that the detection of a test element, such as a test strip, or of a part thereof, such as of a test field, or rather time-consuming and resource-consuming, which specifically is detrimental for real-time calculations which are often used for providing user guidance during imaging. Thus, generally, the actual size of a test element within an image is typically unknown. Further, the resolution of the camera is also typically unknown, which specifically incurs disadvantages for pattern recognition and statistical analysis.

SUMMARY

This disclosure provides methods and devices which address the above-mentioned technical challenges of analytical measurements using mobile devices such as consumer-electronics mobile devices, specifically multipurpose mobile devices which are not dedicated to analytical measurements such as smart phones or tablet computers. Specifically, methods and devices are disclosed which are widely applicable to available mobile devices and which are suited to increase measurement accuracy and convenience for the user.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "camera," "reference object," "image," and "spatial dimension," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, a method for evaluating the suitability of a mobile device is disclosed, the mobile device having at least one camera for performing an analytical measurement. The analytical measurement, as will be outlined in further detail below, specifically may be on a color formation reaction, e.g., by using at least one test chemical as described above. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method steps comprised by the method are as follows:
a) providing the at least one mobile device having the at least one camera;
b) providing at least one reference object having at least one predefined spatial extension in at least one spatial dimension;
c) taking at least one image of at least part of the reference object by using the camera; and
d) deriving at least one item of spatial resolution information by using the image.

The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, as will be outlined in further detail below, the mobile device may also refer to a tablet computer or another type of portable computer having at least one camera.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, a two-dimensional or even three-dimensional optical information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip. The image itself, thus, may comprise pixels, the pixels of the image correlating to pixels of the camera chip. Consequently, when referring to "pixels," reference is either made to the units of image information generated by the single pixels of the camera chip or to the single pixels of the camera chip directly.

The camera, besides the at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually. The camera, specifically, may be integrated into the mobile device.

The term "suitability" as used herein is a broad term and is to be given its ordinary and customary meaning to a person of ordinary skill in the art and is not to be limited to a special or customized meaning. The term specifically may refer, without limitation, to a property of an element or device for performing one or more predetermined functions. Thus, as an example, the suitability may be qualified or quantified by using one or more characteristic parameters of the device. These one or more characteristic parameters, as will be outlined in further detail below, may, individually or according to a predetermined combination, be compared with one or more conditions. As a simple example, the individual parameters or one or more of the parameters may be compared with one or more comparative values, reference values or standard values, wherein the comparison may be a qualitative or a quantitative comparison and may result in a binary result such as "suited" or "not suited"/"unsuited." As an example, the at least one comparative or reference value may comprise at least one threshold value as will be outlined in further detail below. Additionally or alternatively, however, the comparison may result in a quantitative result, such as a figure indicating a degree of suitability. The comparative values, reference values or standard values may be derived, as an example, from experiments or from boundary conditions determined, e.g., by the precision to be achieved.

The term "analytical measurement" as used herein is a broad term and is to be given its ordinary and customary meaning to a person of ordinary skill in the art and is not to be limited to a special or customized meaning. The term specifically may refer, without limitation, to a qualitative and/or quantitative determination of at least one analyte in a sample. The result of the analytical measurement, as an example, may be a concentration of the analyte and/or the presence or absence of the analyte to be determined.

The at least one analyte, as an example, may be or may comprise one or more specific chemical compounds and/or other parameters. As an example, one or more analytes may be determined which take part in metabolism, such as blood glucose. Additionally or alternatively, other types of analytes or parameters may be determined, e.g., a pH value. The at least one sample, specifically, may be or may comprise at least one bodily fluid, such as blood, interstitial fluid, urine, saliva or the like. Additionally or alternatively, however, other types of samples may be used, such as water.

The analytical measurement, specifically, may be an analytical measurement including a change of at least one optical property of a test element, which change may be measured or determined visually by using the camera. Specifically, the analytical measurement may be or may comprise a color formation reaction in the presence of the at least one analyte to be determined. The term "color formation reaction" as used herein is a broad term and is to be given its ordinary and customary meaning to a person of ordinary skill in the art and is not to be limited to a special or customized meaning. The term specifically may refer, without limitation, to a chemical, biological or physical reaction during which a color, specifically a reflectance, of at least one element involved in the reaction, changes with the progress of the reaction. Thus, as an example, reference may be made to the above-mentioned biochemical reactions which typically are used for detecting blood glucose, involving a color change. Other types of color changing or color formation reactions are known to the skilled person, such as typical chemical reactions for determining the pH value.

The term "reference object" as used herein is a broad term and is to be given its ordinary and customary meaning to a person of ordinary skill in the art and is not to be limited to a special or customized meaning. The term specifically may refer, without limitation, to an arbitrary object which has a predefined spatial extension in at least one spatial dimension. As an example, the reference object may be or may comprise one or more of a visual reference scale, a visual reference field or a visual reference mark attached to, printed onto or integrated into at least one object. Thus, as will be outlined in further detail below, as an example, the reference object may be one or more of a visual reference scale, visual reference field or a visual reference mark attached to, printed onto or integrated into an object such as: a test element, specifically a test strip; a test element container, specifically a test strip container; a package for receiving at least one test element. As an example, the reference object may be a reference field having a known or predefined spatial extension in at least one spatial dimension, such as in an x- and/or y-direction in a coordinate system attached to the reference object, the reference object being, e.g., printed onto a surface of the object. Additionally or alternatively, however, the object itself, such as one or more of a test strip container, a package for receiving the at least one test element or the test strip or a part thereof may also function as a reference object. Thus, as an example, the width and/or the length of the test strip and/or of a test field of the test strip is generally known very precisely. By taking an image of the test strip and by counting, as an example, the number of pixels over the width of the test strip within the image of the test strip, the test strip itself may function as a reference object. The reference object may also have multiple functions. Thus, as an example, the reference object may comprise a reference color field which, as an example, may not only provide a reference color but may also provide spatial reference in at least one spatial dimension.

As further used therein, the term "predefined spatial extension in at least one spatial dimension" is a broad term and is to be given its ordinary and customary meaning to a person of ordinary skill in the art and is not to be limited to a special or customized meaning. The term specifically may refer, without limitation, to a known or determinable extension such as a width, a hide or a depth, e.g., in at least one direction in space, such as a direction determined by the reference object itself, e.g., by its longitudinal or lateral extension of the object. Thus, as an example, if an image of the test strip or the test field is taken, the test strip or test field having essentially rectangular shape, a first side of the rectangular shape may define an x-direction or x-dimension, and a second side of the rectangular shape may define a y-direction or y-dimension. Thus, as an example, an extension of the test strip or test field in the x-dimension may be the width of the test strip or test field, whereas, as an example, an extension of the test strip or test field in the y-dimension may be the height of the test strip or test field. Since the width and/or the height by usually known, the test strip or test field, as an example, may provide or function as a reference object.

The taking of the at least one image of at least part of the reference object by using the camera specifically may imply taking an image which at least comprises a region of interest within the at least one reference object. Thus, as an example, the reference object may be detected automatically within the image, e.g., by pattern recognition techniques generally known to the skilled person, and at least one region of interest may be chosen within the reference object, e.g., a rectangular, square, polygonal, oval or round region of interest.

The taking of the at least one image may be initiated by the user action or may automatically be initiated, e.g., once the presence of the at least one reference object within a field of view and/or within a predetermined sector of the field of view of the camera is automatically detected. These automatic image acquisition techniques are known, e.g., in the field of automatic barcode readers, such as from automatic barcode reading apps. The taking of the at least one part of the reference object specifically may take place such that at least one part of the reference object having at least one predefined spatial extension in at least one spatial dimension is visible, from which the above-mentioned spatial resolution information may be derived. Thus, as an example, it is generally sufficient to take an image of an edge, e.g., an edge of a reference color field or a test field, or an image of a part of a test strip, e.g., a small edge of the test strip, for which a real spatial extension is known.

The term "spatial resolution information" as used herein is a broad term and is to be given its ordinary and customary meaning to a person of ordinary skill in the art and is not to be limited to a special or customized meaning. The term specifically may refer, without limitation, to an arbitrary item of information, e.g., one or more numerical values, which quantify the capability of the camera of resolving two or more objects in the image. Thus, as an example and without limiting further possibilities, the at least one item of spatial resolution information may comprise at least one item of information regarding a quotient of the image size and the object size or the inverse quotient. Additionally or alternatively, the at least one item of spatial resolution information may also comprise the number of pixels in the image in at least one spatial dimension per unit distance in the real object or reference object. Thus, as an example, when a line, a scale, an edge or another type of reference object having a predetermined spatial extension in the at least one spatial dimension is imaged, the at least one spatial resolution information may contain information regarding the number of pixels in the at least one spatial dimension onto which the reference object is imaged. The spatial resolution information, thus, may be represented by a figure having the unit "pixels/mm" or another unit indicating the number of pixels per distance unit. The at least one spatial resolution information specifically may provide information on how close two different items or elements in the real world may be located in order to be separated in the image.

As will be outlined in further detail below, various ways of determining the at least one item of spatial resolution information (also referred to herein as simply "spatial resolution information") are generally known and may be used in the present method. As an example, the spatial resolution information may simply be generated by counting the number of pixels, specifically the number of pixels along one axis, of the image of the reference object and dividing the number of pixels by the known spatial extension of the reference object. Thus, as an example, an edge of the test strip having a known length L may, in the image of the edge, have a length of N pixels, such that the at least one item of spatial resolution may simply be calculated as $R=N/L$ or $R=L/N$. Thus, generally, the at least one item of spatial resolution information may comprise a reproduction scale indicating a number of pixels per distance unit in the at least one spatial dimension of the image.

The determining of the at least one item of spatial resolution information specifically may take place by using at least one of a transformation algorithm, transforming the at least one image or a part thereof into the at least one item of spatial resolution information. Thus, as an example, an image recognition algorithm may be used, in order to detect, e.g., an edge or another type of reference object, in order to count the pixels and in order to calculate or determine by other means the at least one item of spatial resolution information thereof. Specifically, as will be outlined in further detail below, the deriving of the at least one item of spatial resolution information may take place by using at least one processor.

The method according to the first aspect may further be refined by comprising the following step:
e) comparing the at least one item of spatial resolution information with at least one threshold value, thereby determining at least one item of suitability information on the suitability of a mobile device for the purpose of performing the analytical measurement.

Thus, at least one threshold value for the at least one item of spatial resolution information may be given, such as a predetermined or determinable threshold value. As outlined above, as an example, the at least one threshold value may be determined or predefined by a desired precision of the analytical measurement. The at least one threshold value specifically may be determined by a minimum number of pixels in the at least one spatial dimension within at least one region of interest in the image. Thus, as an example and as will be outlined by exemplary embodiments in further detail below, for glucose measurements, a certain maximum tolerance may be given, such as a maximum deviation of 2% at 100 mg/dl blood glucose concentration. Since the precision of the measurement or the tolerance of the measurement generally, as known to the skilled person in the field of statistics, may be improved by averaging over a large number of pixels and since, typically, the error of mean value is inversely proportional to the square root of the number of pixels over which an averaging takes place, the maximum tolerance or maximum deviation may be transformed into a minimum spatial resolution or a minimum number of pixels per image, per unit area, per unit distance or the like. Thus, as an example, the at least one item of spatial resolution information derived in step d) may be compared with a threshold value derived from the desired accuracy of the glucose concentration determination or the desired accuracy of another type of analytical measurement. It shall be noted, however, that other possibilities for comparing the at least one item of spatial resolution information with the at least one threshold value are feasible. Thus, as an example, comparisons of the type $R<T$; $R>T$; $R \leq T$; $R \geq T$; $T1<R<T2$; $T1 \leq R<T2$; $T1<R \leq T2$ or $T1 \leq R \leq T2$ are feasible, with T, T1, T2 being threshold values and R being the at least one item of spatial resolution information.

The term "item of suitability information" as used herein is a broad term and is to be given its ordinary and customary meaning to a person of ordinary skill in the art and is not to be limited to a special or customized meaning. The term specifically may refer, without limitation, to an indication or information regarding the suitability, specifically in the present case of the suitability of the mobile device for the purpose of performing the analytical measurement. The item of suitability information, as an example, may be Boolean or digital information, such as indicating "suited" or "not suited"/"unsuited." Thus, as an example, in case the width of the distribution of a peak of a statistical distribution of a color coordinate may be compared with at least one threshold value, e.g., a threshold value derived by using a maximum tolerance of a glucose measurement, and, in case the width is larger than the threshold value or a larger or at least equal to the threshold value, the mobile device may be determined as being unsuited for the purpose of performing the analytical measurement. Alternatively, however, as already outlined above, the suitability may also be quantified.

The term "region of interest" (ROI) as used herein is a broad term and is to be given its ordinary and customary meaning to a person of ordinary skill in the art and is not to be limited to a special or customized meaning. The term specifically may refer, without limitation, to a subset of data within a larger data set, the subset being identified for a particular purpose. As an example, the term may refer to at least one partial image or region within an image, determined for a certain purpose. In the present context, the region of interest specifically may be a partial image which is used in step d) for deriving the at least one item of spatial resolution information. In the context of the at least one analytical measurement, as will be explained with respect to method step iii) below, the at least one region of interest specifically may be a region within the image of a test field, e.g., circle, oval, polygon or square, e.g., a maximum square, within the part of the image which contains the test field. As an example, by using an image recognition algorithm, the test field may be recognized in the image, and a region of interest, e.g., a square region of interest, may be defined within this image of the test field, for the purpose of analysis, e.g., of the color formation reaction. Thus, as an example, the color, e.g., at least one color coordinate, of the pixels within the at least one region of interest may be determined, including, e.g., statistical analysis such as determining a center of distribution and determining a deviation such as a standard deviation. For determining the region of interest, as an example, certain features within the image, either the image of the reference object or the image of the test element, may be detected, e.g., by image recognition techniques generally known to the skilled person, such as by recognizing the shape or order lines of the reference object and/or the test field. The region of interest, specifically, may be detected automatically. The determination of the region of interest may also be repeated in case no region of interest can be determined or in case the image quality is detected to be too low for determining the region of interest. Further exemplary embodiments will be given below.

The method may further comprise:
f) adjusting a scaling information of the mobile device by using the at least one item of spatial resolution information.

The term "scaling information" as used herein is a broad term and is to be given its ordinary and customary meaning to a person of ordinary skill in the art and is not to be limited to a special or customized meaning. The term specifically may refer, without limitation, to an arbitrary type of information indicating a relationship between a distance in the image and the corresponding distance in the real world. Thus, as an example, the scaling information may indicate the distance in real life to which a certain number of pixels correspond. This information, as an example, may refer to a predetermined or determinable distance between the camera and an object which is image by the camera. As an example and as is typically the case, in step c), the reference object generally may be brought as close to the camera as is technically feasible without losing sharpness. As an example, the reference object may be brought into a minimum distance to the camera for taking the image, such that the image still is sharp. Similarly, in step iii) below, the test element, when taking the image of at least part of the test element in partial step b., may be brought to the minimum distance in front of the camera has to still obtain a sharp image. The scaling information may refer to this minimum distance. Generally, once the at least one item of spatial resolution information is determined, this spatial resolution information generally may also provide scaling information. When starting the method, the scaling information may be set to a default value, and, in step f), the scaling information may be adjusted in accordance with the at least one item of spatial resolution information gained in step d).

The at least one scaling information may be used in various ways. Thus, as an example, as will be outlined in further detail below, visual guidance may be given to the user when taking the image, either when taking the image of the reference object in step c) and/or when taking the image of the test field in step iii) b. below. Thus, as an example, the guidance may include superimposing a shape of the reference image and/or a shape of the test element and/or of the test field when taking the image, wherein the size of the shape may be adjusted in accordance with the scaling information.

Further optional details may relate to the deriving of the at least one item of spatial resolution information in step d). Thus, as an example, the step of deriving the at least one item of spatial resolution information by using the image may comprise the following sub steps:
- d1) recognizing within the image the at least one reference object having at least one predefined spatial extension in at least one spatial dimension;
- d2) determining a number of pixels of the object in the image in the at least one spatial dimension;
- d3) deriving the at least one item of spatial resolution information by using the number of pixels and the predefined spatial extension of the reference object in the at least one spatial dimension.

Potential embodiments of these substeps were already discussed in part above. Therein, step d3) specifically may comprise determining a quotient of the number of pixels and the predefined spatial extension or an inverse value thereof for deriving the at least one item of spatial resolution information.

The method according to any one of the preceding claims, wherein the method comprises using at least one processor and software instructions for performing at least method step d).

As will be outlined in further detail below, the method of evaluating the suitability of a mobile device as well as the below mentioned method of performing an analytical measurement specifically may fully or partially be computer implemented, specifically on a computer of the mobile device, such as a processor of the mobile device. Thus, specifically, the method may comprise using at least one processor and software instructions for performing at least method step d). Specifically, the methods may fully or partially be implemented as so-called apps, e.g., for Android or iOS, and may, as an example, be downloadable from an app store. Thus, specifically, in the method of evaluating the suitability of a mobile device, the method may comprise using at least one processor and software instructions for performing at least method step d). The software instructions, specifically the app, further may provide user instructions, e.g., by one or more of a display, by audio instructions or other instructions, in order to support method steps a), b) and c). Therein, as indicated above, method step c) may also fully or partially be computer implemented, e.g., by automatically taking the at least one image of the at least one part of the reference object by using the camera once the reference object or a part thereof is within a field of view of the camera and/or within a certain range within the field of view. The processor for performing the method specifically may be part of the mobile device.

As outlined above, the mobile device specifically may be a mobile computer and/or a mobile communications device. Thus, specifically, the mobile device may be selected from the group consisting of: a mobile communications device, specifically a smart phone; a portable computer, specifically a notebook; a tablet computer.

As indicated above, further method steps may be computer implemented or computer assisted, specifically by a processor of the mobile device. Thus, as an example, method step c) may comprise providing visual guidance for a user for positioning the mobile device relative to the object. Additionally or alternatively, audio guidance or other type of guidance may be given.

Further embodiments may refer to the reference object. As discussed above, the reference object may fully or partially be comprised by another object, in the following simply referred to as "an object." The object specifically may be selected from the group consisting of: a test element, specifically a test strip; a test element container, specifically a test strip container; a package for receiving at least one test element. Therein, several possibilities exist. First, the reference object may, as an example, be or comprise an imprint on the object, the imprint having a predefined spatial extension or a scale providing the at least one predefined spatial extension in the at least one dimension. Alternatively, the reference object may also be a real object. As an example and as discussed above, the reference object may be a test element or a part thereof, specifically a test field of the test element, the test element or the part thereof having a predefined spatial extension in the at least one dimension.

In a further aspect of this disclosure, a method for performing an analytical measurement is used, wherein the analytical measurement uses a mobile device having at least one camera. The method comprises the following method steps, which may be performed in the given order. Again, however, a different order may also be possible. Further, one, more than one or even all of the method steps may be performed once or repeatedly. Further, the method steps may be performed successively or, alternatively, two or more method steps may be performed in a timely overlapping fashion or even in parallel. The method may further comprise additional method steps which are not listed.

The method comprises the following steps:
- i) evaluating the suitability of the mobile device by using the method according to any one of the preceding claims;
- ii) if the at least one item of spatial resolution information indicates the mobile device being unsuited for performing the analytical measurement, aborting the method for performing the analytical measurement;
- iii) if the at least one item of spatial resolution information indicates the mobile device being suited for performing the analytical measurement, performing the analytical measurement, comprising the following steps:
  - a. applying at least one sample to at least one test element having at least one test chemical capable of a color formation reaction;
  - b. taking at least one image of at least part of the test element by using the camera;
  - c. evaluating the image and deriving at least one analytical information thereof.

For further possible definitions of most of the terms used herein, reference may be made to the disclosure of the method of evaluating the suitability of the mobile device as disclosed above or as disclosed in further detail below.

With respect to method step i), reference may be made to the description of the method above. Thus, as an example, reference may be made to the description of method step e), wherein the at least one item of spatial resolution information may be compared with at least one threshold value, thereby determining at least one item of suitability information on the suitability of a mobile device for the purpose of performing the analytical measurement. Method step i), as an example, may make use of the at least one item of suitability information which, as an example, may be or may comprise digital information or Boolean information "suited" or "not suited." Depending on this suitability information, the method may branch in between steps ii) and iii), wherein the inquiry regarding the suitability in step i) may be programmed, e.g., as an "if . . . " routine, an "if . . . else . . . " routine or the like.

For evaluating the at least one image and deriving the at least one analytical information thereof, several algorithms may be used which generally are known to the skilled person in the field of analytics, such as in the field of blood glucose monitoring. Thus, as an example, a color of the test element, such as a color of at least one test field having at least one test chemical, may be evaluated. As an example, when evaluating the image, a region of interest may be defined within the image of the test element, such as a region of interest within a test field of the test element, and an analysis of the color may be performed, such as a statistical analysis. As an example, a rectangular, square, polygonal, oval or circular region of interest may be defined within the part of the image which is recognized to be an image of the test field. Subsequently, a statistical analysis of the color of the pixels within the region of interest may be performed. As an example, one or more color coordinates may be derived for the pixels, and a statistical analysis of the color coordinates may be performed over the region of interest. As an example, the center of the distribution of the at least one color coordinate may be determined. The term "color coordinate" as used herein is a broad term and is to be given its ordinary and customary meaning to a person of ordinary skill in the art and is not to be limited to a special or customized meaning. The term specifically may refer, without limitation, to the coordinate of an arbitrary color coordinate system used for describing a color using coordinates. Several color coordinate systems are generally known to the skilled person and may also be used in the context of this disclosure. Thus, as an example, a colorimetric coordinate system or a coordinate system may be used which is based on the human perception, such as the CIE 1964 color space, the Munsell color system or other coordinate systems, such as R, G, B, L, a, b.

Thus, for deriving the analytical information from the image, as an example, a predetermined or determinable relationship between the at least one color coordinate of the test element, such as the test field, may be monitored. As outlined above, statistical analysis may be performed over the test element or a part thereof, such as over a test field containing the at least one test chemical and/or over a region of interest within the test field containing the at least one test chemical. Thus, as an example, the at least one test field within the image of the test element may be recognized, preferably automatically, e.g., by pattern recognition and/or other algorithms as described in examples below. Again, one or more regions of interest may be defined within the partial image of the test field. Over the region of interest, color coordinates, e.g., again blue color coordinates and/or other color coordinates, may be determined, e.g., again by using one or more histograms. The statistical analysis may comprise sitting one or more fitting curves, such as described above, to the at least one histogram, thereby, e.g., determining a center of a peak. Thus, the color formation reaction may be monitored by using one or more images, wherein, for the one or more images, by using statistical analysis, the center of the peak may be determined, thereby determining a color shift within the at least one coordinate. Once the color formation reaction is finished or has reached a predetermined or determinable endpoint, as the skilled person generally knows, e.g., from blood glucose monitoring, the shift in the at least one color coordinate or an endpoint color coordinates may be determined and may be transformed into, e.g., a concentration of the analyte in the sample by using a predetermined or determinable correlation between the color coordinate and the concentration. The correlation, as an example a transformation function, a transformation table or a lookup table, may be determined, e.g., empirically and may, as an example, be stored in at least one data storage device of the mobile device, e.g., by the software, specifically by the app downloaded from an app store or the like.

As discussed above, in the methods known in the art, calibration information is typically provided by the test strip or test element itself. The method as proposed herein, however, may separate the step of evaluating the suitability of the mobile device and the actual step of performing the analytical measurement, wherein, once the suitability is determined, an arbitrary number of analytical measurements may be performed using the mobile device. Alternatively, however, the evaluation of the suitability of the mobile device in step i) may be repeated, e.g., after predetermined or determinable intervals or in case any changes are made to the mobile device. The software, e.g., the software app, may prompt the user to perform method step i), e.g., by providing corresponding instructions on a display and/or as audio instructions. Specifically, however, method step i) may be performed at least once before method step iii) is performed, if at all. Method step i) may be performed once before method step iii) is performed at least once, or method step i) may be performed once before method step iii) is performed repeatedly.

In case the at least one item of spatial resolution information indicates the mobile device being unsuited for performing the analytical measurement, the method of performing the analytical measurement may be aborted. This abortion, as an example, may also comprise informing a user of the mobile device of the unsuitability of the mobile device for performing the analytical measurement. The information, as an example, may be provided as the usual information on a display and/or as audible information.

Additionally or alternatively, in case the mobile device is determined as being unsuited for performing the analytical measurement, step ii) may also comprise blocking future attempts to perform the analytical measurement by using the mobile device. Thus, as an example, in case a user retries to start the software app on his or her mobile phone, a message such as "Sorry, mobile device not suited!" or the like may be displayed on a display, and the analytical measurement may be prevented.

Again, additionally or alternatively, step ii) may also comprise sending information on the mobile device being unsuited for performing the analytical measurement to a software download server, specifically in order to inform the software download server that this specific type of mobile device is unsuited, more specifically for preventing future offering of software download of software for analytical measurement for this specific type of mobile device. Thus, as an example, the download server may receive information regarding this unsuitability and may not provide analytical software download for this specific type of mobile device in the future.

Further details may refer to the step b. of taking the at least one image. Thus, step b may comprise the following substeps:
- b1. determining a target size for the test element or of a test field of the test element in the image;
- b2. providing user guidance during taking the image by superimposing a visual indicator representing the target size.

Thus, as an example, by using the at least one item of spatial resolution information, the method may determine a desired size of the test element in the image, e.g., at a predetermined distance, e.g., the above-mentioned minimum distance at which still a sharp image may be acquired. As an example, if the width and the length of the test strip or the test field are known in millimeters and if the spatial resolution information comprises information regarding the number of pixels corresponding to 1 mm, the number of pixels corresponding to the width and the number of pixels corresponding to the length may easily be calculated by simply multiplying the pixels per millimeter with the width or the length, respectively. Thereby, as an example, a visual indicator may be created on a screen of the mobile device and may be superimposed to the current image, e.g., a square or rectangular box. The user may adjust the position of the mobile device and the distance between the mobile device and the test element correspondingly, until the test element or the test field are within the box. Other visual indicators are feasible. Once the method recognizes that the desired position is reached, the image acquisition may start automatically.

The target size specifically may be determined by using the at least one spatial resolution information and a predetermined minimum number of pixels for performing step c., specifically a minimum number of pixels within a region of interest within the image, and by deriving the target size thereof.

Thus, as outlined above, step c. specifically may comprise defining a region of interest within the image and detecting a color information by statistical analysis over the pixels of the region of interest and deriving the at least one analytical information by using the color information. A computer program including computer-executable instructions for performing the method according to any one of the preceding claims, specifically method step d) and optionally one or more of the method steps c) and e), when the program is executed on a computer or computer network, specifically a processor of a mobile device having at least one camera.

In a further aspect, a computer program including computer-executable instructions for performing the method according to any one of the embodiments as described herein is disclosed, specifically method step d) and optionally one or more of the method steps c), e) and f), when the program is executed on a computer or computer network, specifically a processor of a mobile device having at least one camera. Further, the computer-executable instructions may also be suited for performing method steps i) and ii) and, optionally, to provide at least guidance for method step iii). Therein, use or guidance for partial step a) may be provided, the taking of the at least one image in partial step b) may be initiated automatically by the computer-executable instructions, and the evaluation of the image and the deriving of the analytical information in step c) may be performed by computer-executable instructions.

Thus, generally speaking, disclosed and proposed herein is a computer program including computer-executable instructions for performing the method according to one or more of the embodiments disclosed herein when the program is executed on a computer or computer network. Specifically, the computer program may be stored on a computer-readable data carrier. Thus, specifically, one, more than one or even all of the method steps as indicated above may be performed by using a computer or a computer network, preferably by using a computer program. The computer specifically may be fully or partially integrated into the mobile device, and the computer programs specifically may be embodied as a software app. Alternatively, however, at least part of the computer may also be located outside the mobile device.

Further disclosed and proposed herein is a computer program product having program code means, in order to perform the method according to one or more of the embodiments disclosed herein when the program is executed on a computer or computer network, e.g., one or more of the method steps mentioned above. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein, specifically one or more of the method steps mentioned above.

Further disclosed and proposed herein is a computer program product with program code means stored on a machine-readable carrier, in order to perform the method according to one or more of the embodiments disclosed herein, when the program is executed on a computer or computer network, specifically one or more of the method steps mentioned above. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein, specifically one or more of the method steps mentioned above.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

In a further aspect, a mobile device for performing an analytical measurement based on a color formation reaction is disclosed. The mobile device comprises at least one camera. The mobile device is configured for performing a self-suitability evaluation by using the following steps:

I. taking at least one image of at least part of at least one reference object having at least one predefined spatial extension in at least one spatial dimension by using the camera; and II. deriving at least one item of spatial resolution information by using the image.

For most of the terms used herein and possible definitions, reference may be made to the description of the methods above. The term "self-suitability evaluation" as used herein is a broad term and is to be given its ordinary and customary meaning to a person of ordinary skill in the art and is not to be limited to a special or customized meaning. The term specifically may refer, without limitation, to a process of a device for evaluating whether the device itself is suited or not suited for a predetermined purpose, wherein, with respect to the suitability, reference may be made to the description given above.

The mobile device specifically may be configured for performing at least one analytical measurement by using the following steps:

III. evaluating the suitability of the mobile device based on the at least one item of spatial resolution information;

IV. if the at least one item of spatial resolution information indicates the mobile device being unsuited for performing the analytical measurement, aborting the analytical measurement;

V. if the at least one item of spatial resolution information indicates the mobile device being suited for performing the analytical measurement, performing the analytical measurement, comprising the following steps:
 a. taking at least one image of at least part of a test element by using the camera, the test element having at least one test chemical capable of a color formation reaction, specifically at least one test field, the test element having applied thereto at least one sample;
 b. taking at least one image of at least part of the test element by using the camera;
 c. evaluating the image and deriving at least one analytical information thereof.

For possible definitions or embodiments, reference may be made to the description of the method as given above.

Thus, specifically, the mobile device may be configured for performing the method of evaluating the suitability of a mobile device and/or the method of performing an analytical measurement based on a color formation reaction according to any one of the embodiments described above or described in further detail below. The mobile device specifically may be configured to perform step III. repeatedly. The mobile device specifically may be configured for performing the method as proposed herein, in one or more of the embodiments described above for described in further detail below. Specifically, the mobile device may comprise at least one computer, such as at least one processor, which is programmed to perform the method or, specifically, the method steps indicated above.

In a further aspect, a kit for performing an analytical measurement is disclosed. The kit comprises:
 at least one mobile device according to any one of the embodiments described above or described in further detail below;
 at least one reference object having at least one predefined spatial extension in at least one spatial dimension; and
 at least one test element having at least one test chemical capable of a color formation reaction.

Again, for possible definitions of terms and possible embodiments, reference may be made to the description given above.

The methods and devices disclosed herein may provide a large number of advantages over known methods and devices for analytical measurements. Thus, specifically, a process of performing an analytical measurement as taught herein may be less time-consuming, compared to other processes known in the art. In particular, the disclosed method may evaluate a general aptitude of the mobile device by performing one single measurement. An established aptitude of the mobile device by one single measurement may be valid for all subsequent measurements. Thus, the disclosed method may need less time for performing an analytical measurement compared to prior art approaches focusing on applying correction algorithms prior to each analyte measurement. Specifically, in accordance with this disclosure, the aptitude of the mobile device may be established by one single measurement for essentially all subsequent measurements as opposed to applying correction algorithms prior to each measurement. Thus, the disclosed method may be capable of performing at least one of the subsequent analytical measurements faster than state-of-the-art approaches. Thereby, the disclosed method may simplify the process of performing the analytical measurement for a user. Specifically, once a general aptitude of the mobile device is established, and at least one, preferably all, subsequent measurements the process of performing the analytical measurement may be simpler than state-of-the-art measurements. In particular, using a suitable mobile device, these teachings may simplify the process of performing a blood glucose measurement for a user. When using a suitable mobile device, the process of performing the blood glucose measurement may, particularly, need less time than state-of-the-art processes.

The disclosed method may only allow a use of an application, e.g., an app, including computer-executable instructions for performing an analytical measurement, in conjunction with a mobile device suitable for performing the analytical measurement. Particularly, the method taught herein may only allow the use of the application in conjunction with a mobile device having sufficient spatial resolution when performing the analytical measurement. Thereby, the method taught herein may improve a safety of using a mobile device for performing the analytical measurement, particularly the blood glucose measurement. In particular, the safety of a valid result, e.g., a validity of the determined analyte concentration, may be ensured. Specifically, the method taught herein may ensure measurement quality by identifying the suitability of the mobile device before admitting a use of the mobile device for performing the blood glucose measurement. More specifically, a use of the application including computer-executable instructions for performing such an analytical measurement in conjunction with the mobile device, may only be admitted using the mobile device suitable for the analytical measurement. Particularly, the disclosed method may only admit a usage of the application after the suitability of the mobile device is ensured. For example, a download of the application on a mobile device unsuited or unfit for performing the blood glucose measurement may be inhibited. The download of the application on the mobile device may be restricted until the aptitude of the mobile device may be ensured. Thus, the teachings may improve the safety of blood glucose measurement, for example the validity of the determined blood glucose concentration, using the mobile device by evaluating the suitability of the mobile device, e.g., in an initial validation step or check, prior to admitting the performing of the blood glucose measurement by the mobile device.

In accordance with this disclosure, the suitability of the mobile device may be evaluated internally, e.g., within the mobile device itself. Specifically, the teachings may ensure measurement quality individually for every mobile device. Thus, the measurement quality may be ensured by way of an internal evaluation, as opposed to an external evaluation, evaluating the suitability of the mobile device externally, such as, for example, in a laboratory. Particularly, the external evaluation of a large variety of mobile devices, owned by a wide group of users, may need longer and additionally or externally may consume more resources, than the internal evaluation disclosed herein. Additionally, the method disclosed herein may be available for most recent mobile devices, e.g., newly released smart phones. Thereby, an immediate evaluation of the suitability of the recent mobile device is possible. Therefore, the analyte measurement may be performed with the newly released mobile device faster, than by ensuring measurement quality externally, such as by way of an external evaluation in a laboratory.

Summarizing and without excluding further possible embodiments, the following embodiments may be envisaged:

Embodiment 1

A method for evaluating the suitability of a mobile device having at least one camera for performing an analytical measurement, comprising:
 a) providing the at least one mobile device having the at least one camera;
 b) providing at least one reference object having at least one predefined spatial extension in at least one spatial dimension;
 c) taking at least one image of at least part of the reference object by using the camera; and
 d) deriving at least one item of spatial resolution information by using the image.

Embodiment 2

The method according to the preceding embodiment, further comprising:
 e) comparing the at least one item of spatial resolution information with at least one threshold value, thereby determining at least one item of suitability information on the suitability of a mobile device for the purpose of performing the analytical measurement.

Embodiment 3

The method according to the preceding embodiment, wherein the at least one threshold value is determined by a minimum number of pixels in the at least one spatial dimension within at least one region of interest in the image.

Embodiment 4

The method according to any one of the preceding embodiments, wherein the at least one item of spatial resolution information comprises a reproduction scale indicating a number of pixels per distance unit in the at least one spatial dimension of the image.

Embodiment 5

The method according to any one of the preceding embodiments, further comprising:
 f) adjusting a scaling information of the mobile device by using the at least one item of spatial resolution information.

Embodiment 6

The method according to any one of the preceding embodiments, wherein the step of deriving the at least one spatial resolution information by using the image comprises:
 d1) recognizing within the image the at least one reference object having at least one predefined spatial extension in at least one spatial dimension;
 d2) determining a number of pixels of the object in the image in the at least one spatial dimension;
 d3) deriving the at least one item of spatial resolution information by using the number of pixels and the predefined spatial extension of the reference object in the at least one spatial dimension.

Embodiment 7

The method according to the preceding embodiment, wherein step d3) comprises determining a quotient of the number of pixels and the predefined spatial extension or an inverse value thereof for deriving the at least one item of spatial resolution information.

Embodiment 8

The method according to any one of the preceding embodiments, wherein the method comprises using at least one processor and software instructions for performing at least method step d).

Embodiment 9

The method according to the preceding embodiment, wherein the processor is part of the mobile device.

Embodiment 10

The method according to any one of the preceding embodiments, wherein the mobile device is selected from the group consisting of: a mobile communications device, specifically a smart phone; a portable computer, specifically a notebook; a tablet computer.

Embodiment 11

The method according to any one of the preceding embodiments, wherein method step c) comprises providing visual guidance for a user for positioning the mobile device relative to the reference object.

Embodiment 12

The method according to any one of the preceding embodiments, wherein the reference object is fully or partially comprised by an object.

Embodiment 13

The method according to the preceding embodiment, wherein the object is selected from the group consisting of: a test element, specifically a test strip; a test element container, specifically a test strip container; a package for receiving at least one test element.

Embodiment 14

The method according to any one of the two preceding embodiments, wherein the reference object is an imprint on the object, the imprint having a predefined spatial extension or a scale providing the at least one predefined spatial extension in the at least one dimension.

Embodiment 15

The method according to any one of the three preceding embodiments, wherein the reference object is a test element or a part thereof, specifically a test field of the test element, the test element or the part thereof having a predefined spatial extension in the at least one dimension.

Embodiment 16

A method for performing an analytical measurement by using a mobile device having at least one camera, comprising:
i) evaluating the suitability of the mobile device by using the method according to any one of the preceding embodiments;
ii) if the at least one item of spatial resolution information indicates the mobile device being unsuited for performing the analytical measurement, aborting the method for performing the analytical measurement;
iii) if the at least one item of spatial resolution information indicates the mobile device being suited for performing the analytical measurement, performing the analytical measurement, comprising the following steps:
  a. applying at least one sample to at least one test element having at least one test chemical capable of a color formation reaction;
  b. taking at least one image of at least part of the test element by using the camera;
  c. evaluating the image and deriving at least one analytical information thereof.

Embodiment 17

The method according to the preceding embodiment, wherein step i) is performed at least once before step iii) is performed.

Embodiment 18

The method according to any one of the two preceding embodiments, wherein step ii) comprises informing a user of the mobile device of the unsuitability of the mobile device for performing the analytical measurement.

Embodiment 19

The method according to any one of the three preceding embodiments, wherein step ii) comprises blocking future attempts to perform the analytical measurement by using the mobile device.

Embodiment 20

The method according to any one of the four preceding embodiments, wherein step ii) comprises sending information on the mobile device being unsuited for performing the analytical measurement to a software download server, specifically in order to inform the software download server that this specific type of mobile device is unsuited, more specifically for preventing future offering of software download of software for analytical measurement for this specific type of mobile device.

Embodiment 21

The method according to any one of the five preceding embodiments, wherein step b. comprises the following sub-steps:
  b1. determining a target size for the test element or of a test field of the test element in the image;
  b2. providing user guidance during taking the image by superimposing a visual indicator representing the target size.

Embodiment 22

The method according to the preceding embodiment, wherein the target size is determined by using the at least one spatial resolution information and a predetermined minimum number of pixels for performing step c., specifically a minimum number of pixels within a region of interest within the image, and by deriving the target size thereof.

Embodiment 23

The method according to any one of the seven preceding embodiments, wherein step c. comprises defining a region of interest within the image and detecting a color information by statistical analysis over the pixels of the region of interest and deriving the at least one analytical information by using the color information.

Embodiment 24

A computer program including computer-executable instructions for performing the method according to any one of the preceding embodiments, specifically method step d) and optionally one or more of the method steps c) and e), when the program is executed on a computer or computer network, specifically a processor of a mobile device having at least one camera.

Embodiment 25

A mobile device for performing an analytical measurement, the mobile device having at least one camera, the mobile device being configured for performing a self-suitability evaluation by using the following steps:
  I. taking at least one image of at least part of at least one reference object having at least one predefined spatial extension in at least one spatial dimension by using the camera; and
  II. deriving at least one item of spatial resolution information by using the image.

Embodiment 26

The mobile device according to the preceding embodiment, the mobile device further being configured for performing at least one analytical measurement by using the following steps:
  III. evaluating the suitability of the mobile device based on the at least one item of spatial resolution information;
  IV. if the at least one item of spatial resolution information indicates the mobile device being unsuited for performing the analytical measurement, aborting the analytical measurement;
  V. if the at least one item of spatial resolution information indicates the mobile device being suited for performing the analytical measurement, performing the analytical measurement, comprising the following steps:
    a. taking at least one image of at least part of a test element by using the camera, the test element having at least one test chemical capable of a color formation reaction, specifically at least one test field, the test element having applied thereto at least one sample;
    b. taking at least one image of at least part of the test element by using the camera;
    c. evaluating the image and deriving at least one analytical information thereof.

Embodiment 27

The mobile device according to the preceding embodiment, wherein the mobile device is configured to perform step III. repeatedly.

Embodiment 28

The mobile device according to any one of the two preceding embodiments, wherein the mobile device is configured for performing the method according to any one of the preceding method embodiments.

Embodiment 29

A kit for performing an analytical measurement, the kit comprising:
  at least one mobile device according to any one of the preceding embodiments referring to a mobile device;
  at least one reference object having at least one predefined spatial extension in at least one spatial dimension; and
  at least one test element having at least one test chemical capable of a color formation reaction.

Embodiment 30

The kit according to the preceding embodiment, wherein the reference object is partially comprised by an object selected from the group consisting of: a test element, specifically a test strip; a test element container, specifically a test strip container; a package for receiving at least one test element; a test chart.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIGS. 4 and 5 show embodiments of a mobile device taking an image; and

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
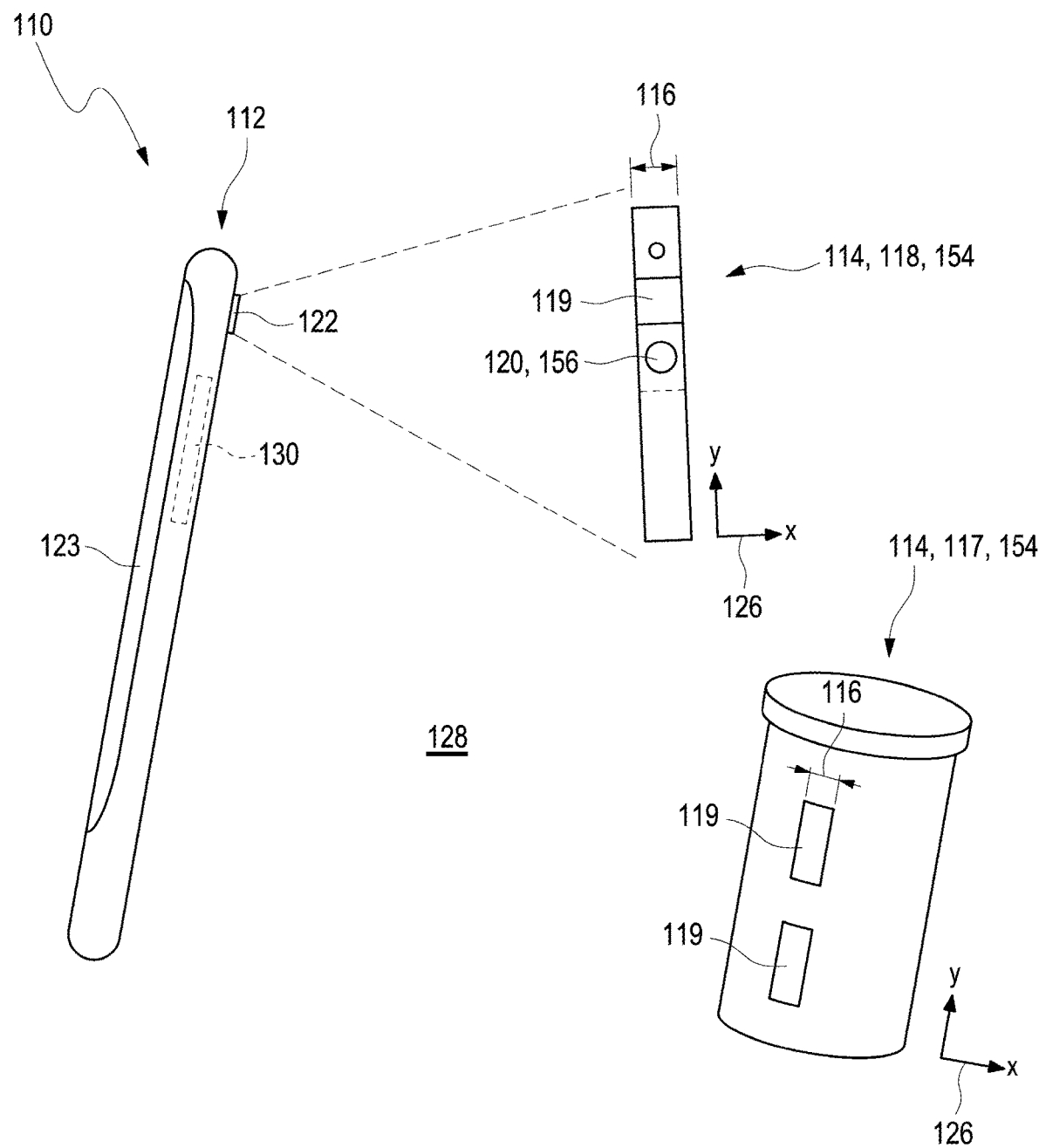
FIG. 1 shows a perspective view of an embodiment of a kit and a mobile device for performing an analytical measurement.

In FIG. 1, a kit 110 for performing an analytical measurement is shown in a perspective view. The kit 110 comprises at least one mobile device 112, at least one reference object 114 having at least one predefined spatial extension 116, and at least one test element 118 having at least one test chemical 120 capable of a color formation reaction. The reference object 114 having the at least one predefined spatial extension 116, as shown in FIG. 1, may be a test element 118, specifically a test strip, or a test element container 117, specifically a test strip container. The reference object 114 may be or may comprise one or more visual reference fields 119 having a predefined spatial extension 116 in at least one spatial dimension 126 in the real world 128, such as, for example, in an x-direction in a x-y-coordinate system attached to the reference object 114. Thus, in FIG. 1, two different possibilities for arranging the at least one visual reference field 119 are shown, which may be realized independently, i.e., the possibility of having the at least one visual reference field 119 comprised by the test element container 117 and/or having the visual reference field 119 comprised by the test element 118.

The mobile device 112, as shown in FIG. 1, has at least one camera 122 and may comprise at least one display 123 and a processor 130. The mobile device 112 is configured for performing a self suitability evaluation. The self-suitability evaluation comprises taking at least one image 124 of at least part of the at least one reference object 114 having at least one predefined spatial extension 116 in at least one spatial dimension 126 by using the camera 122. As an example, the FIGS. 4 and 5 illustrate embodiments of the mobile device 112 taking the image 124. The image 124 of at least part of the at least one reference object, such as the test element 118, may be displayed on the display 128 of the mobile device 112 by a plurality of pixels 132. The reference object 114, e.g., the test element 118, comprises at least one predefined spatial extension 116 in at least one spatial dimension 126. Specifically, information on the predefined spatial extension 116 of the test element 118 in at least one spatial dimension 126 may be known in unit distance within the real world 128.

The self-suitability evaluation further comprises deriving at least one item of spatial resolution information by using the image 124. The item of spatial resolution information may specifically comprise one or more numerical values, quantifying a capability of the camera 122 for resolving two or more objects in the image 124. The item of spatial resolution information may, specifically, comprise at least one item of information regarding a quotient of a size of the image 124 and of a size of the reference object 114 in the real world 128. Thus, the item of spatial resolution information may, for example, be or may comprise a number of pixels 132 in the image 124 in at least one spatial dimension 126 per unit distance in the real world 128 of the reference object 114. In particular, the item of spatial resolution information may provide information on how close two different items or elements in the real world 128 may be located in order to be separated in the image 124.

The item of spatial resolution information may be derived, for example, by counting a number of pixels 132 of the image 124 of the reference object 114, e.g., of the test element 118, in the spatial dimension 126, such as in x-direction, and dividing the number of pixels 132 by the known spatial extension 116 of the reference object 114 in x-direction in unit distance within the real world 128. Thus, as shown in FIGS. 4 and 5, the spatial extension 116 of the test element 118 in the spatial dimension 126, e.g., in the x-direction, may be known in unit distance within the real world 128 and, additionally, the spatial extension 116 of the test element 118 in the x-direction may be known in unit pixel within the image 124. The item of spatial resolution information may be or may comprise a quotient of the spatial extension in unit distance within the real world 128 and unit pixel within the image 124.

Figure 2:
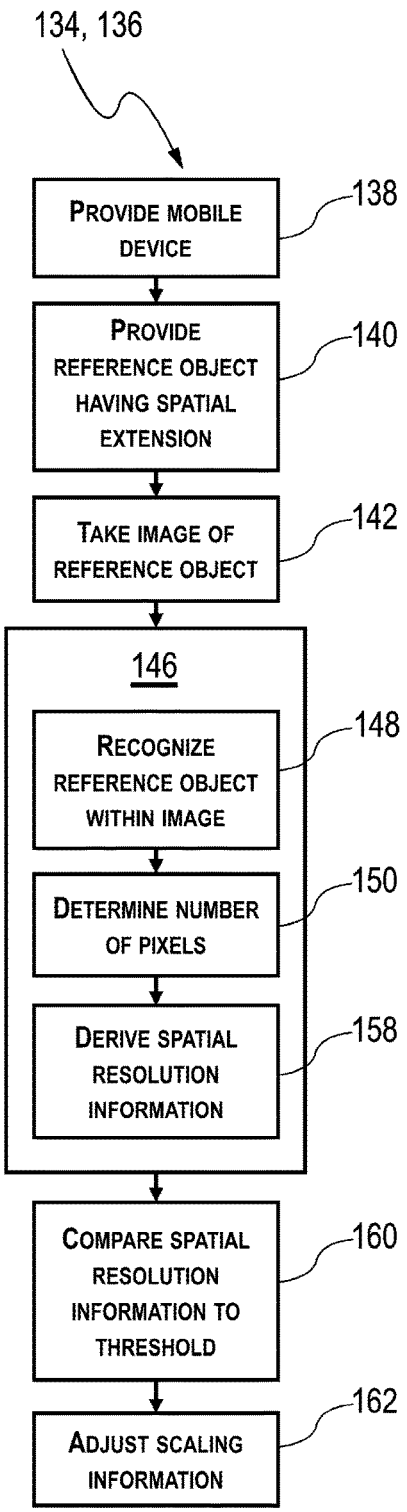
FIG. 2 shows a flow chart of a method for evaluating the suitability of a mobile device.

In FIG. 2, a flow chart 134 of an embodiment of a method 136 for evaluating the suitability of the mobile device 112, as shown in FIGS. 1, 4 and 5 is illustrated. The method 136 comprises step a) (method step 138) providing the at least one mobile device 112 having the at least one camera 122, as for example, shown in FIG. 1. The method 126 further comprises step b) (method step 140) providing at least one reference object 114 having at least one predefined spatial extension 116 in at least one spatial dimension 126, such as shown in FIG. 1. Further, the method 136 comprises step c) (method step 142) taking at least one image 124 of at least part of the reference object 114 by using the camera 122.

An embodiment of a mobile device 112 taking an image 124 (step c) above), the mobile device 112 comprising a camera 122, is illustrated in the FIGS. 4 and 5. Additionally, guidance for positioning the mobile device 112 and/or the camera 122 relative to the reference object 114 may be provided when taking the image 124 of at least part of the reference object 114. The guidance may specifically be a visual guidance and may be or may comprise an outline 144, for example in a shape of the reference object 114, superimposed on the display 123 of the mobile device 112. As illustrated in the FIGS. 4 and 5, the visual guidance may comprise the outline 144 of the test element 118, superimposed on the display 123 of the mobile device 112, providing visual guidance for positioning the camera 122 relative to the test element 118. The method 136 may further comprise step d) (method step 146) deriving the at least one item of spatial resolution information by using the image 124.

Figure 7:
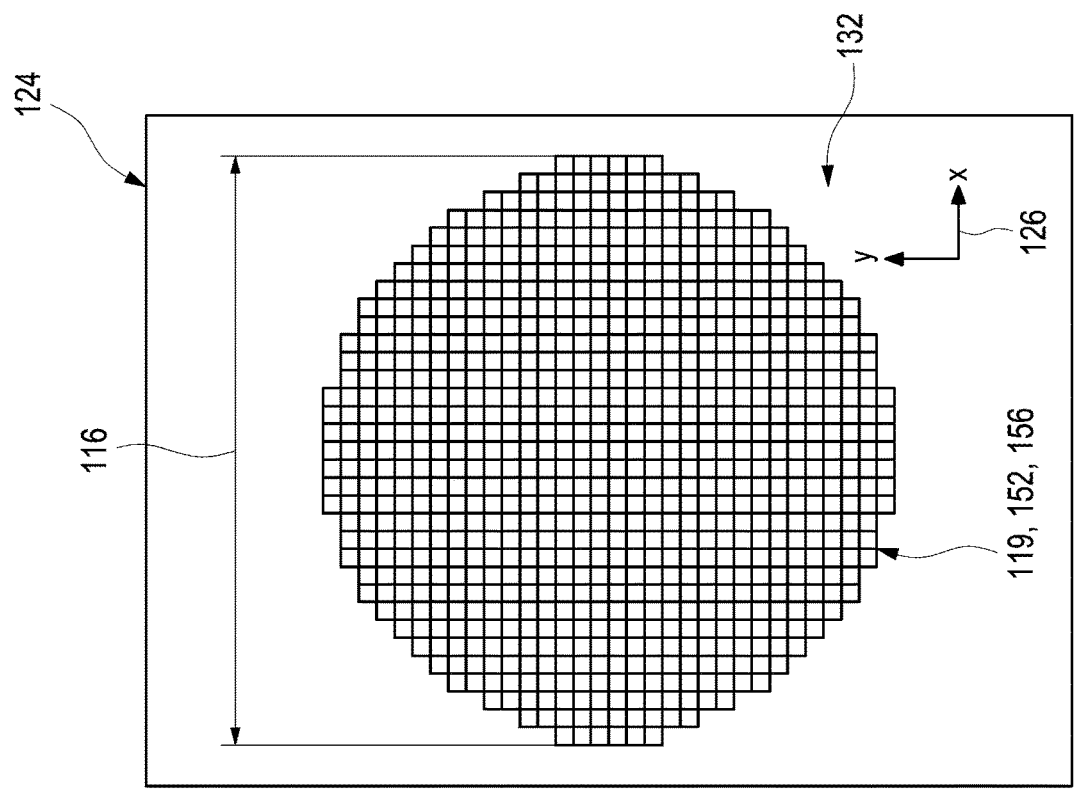
FIGS. 6 and 7 show embodiments of an image of at least part of an object.
Figure 6:
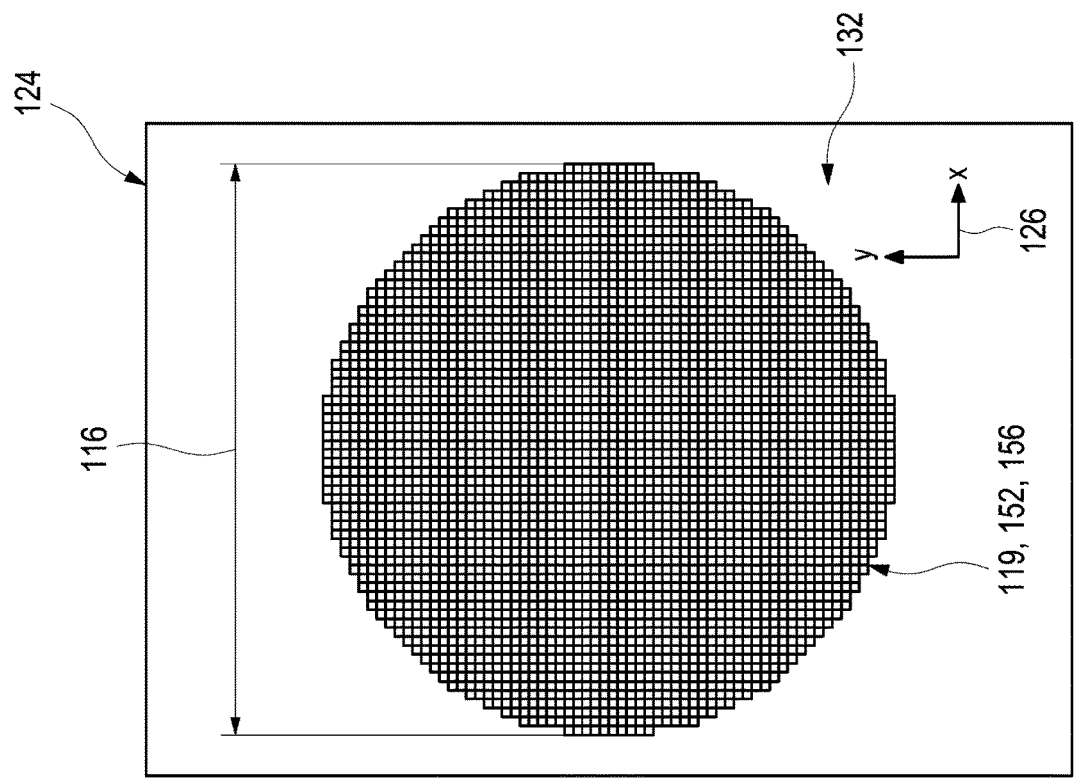

The method step 146 (step d)) may comprise substeps, such as three substeps. A first substep d1) (method step 148) may comprise recognizing within the image 124 the at least one reference object 114 having the at least one predefined spatial extension 116 in the at least one spatial dimension 126. Specifically, the at least one reference object 114 may be recognized within the image 124 by using an image recognition algorithm. More specifically, by using an image recognition algorithm, a region of interest 152 may be identified within the image 124. The region of interest 152 may comprise the at least one visual reference field 119, as illustrated in FIGS. 6 and 7, showing embodiments of an image 124 of at least part of an object 154. The object 154 may be or may comprise the visual reference field 119 or a test field 156 having the test chemical 120 comprised by the test element 118. Thus, the region of interest may, alternatively, comprise the test field 156 when performing the analytical measurement using the mobile device 112 suited for performing the analytical measurement, as further described below. When evaluating the suitability of the mobile device 112 for performing the analytical measurement, the region of interest 152 may specifically comprise the visual reference field 119. However, the visual reference field 119 and the test field 156 may have similar shapes, thus the region of interest 152 may be identical when evaluating the suitability of the mobile device 112 and when performing the analytical measurement, such as illustrated in FIGS. 6 and 7.

A second substep d2) (method step 150) may comprise determining a number of pixels 132 of the object in the image 124 in the at least one spatial dimension 126. Specifically, the number of pixels 132 of a predefined spatial extension 116 of a reference object 114, such as, for example, of the predefined spatial extension 116 in x-direction, may be determined. Depending on the capability of the camera 122 of resolving two or more objects in the image, the predefined spatial extension 116 of the reference object 114 may lead to a different number of pixels 132. Thus, the number of pixels 132 in the predefined spatial extension 116 of the reference object 114 may correlate with the spatial resolution capability of the camera 122. The correlation is illustrated in the FIGS. 6 and 7. FIG. 6 shows an embodiment of an image 124 of at least part of an object 154 taken by a camera 122 with a higher spatial resolution capability than the camera 122 taking the image 124 shown in FIG. 7. Specifically, the image 124 shown in FIG. 6 comprises a higher number of pixels 132 than the image 124 of the same part of the object 154 shown in FIG. 7. More specifically, the region of interest 152 within the image 124 may comprise a higher number of pixels 132 in FIG. 6 than in FIG. 7. Thus, the number of pixels 132 in the predefined spatial extension 116 may be higher in the image 124 illustrated in FIG. 6, than in the image 124 illustrated in FIG. 7.

A third substep d3) (method step 158) may comprise deriving the at least one item of spatial resolution information by using the number of pixels 132 and the predefined spatial extension 116 of the reference object 114 in the at least one spatial dimension 126. Specifically, the item of spatial resolution information may be derived by calculating a quotient of the predefined spatial extension 116 in unit distance within the real world 128 and the predefined spatial extension 116 in unit pixel within the image 124.

The method 136 for evaluating the suitability of the mobile device 112 may further comprise step e) (method step 160) comparing the at least one item of spatial resolution with at least one threshold value, thereby determining at least one item of suitability information on the suitability of a mobile device 112 for the purpose of performing the analytical measurement. The at least one threshold value may be derived from a desired precision of the analytical measurement. For example, the threshold value may be determined by or established as a minimum number of pixels 132 in the at least one spatial dimension 126 within the region of interest 152 in the image 124. Specifically, the threshold value may be given by a maximum tolerance for glucose measurements. More specifically, the threshold value may be derived from the desired accuracy of the analytical measurement, particularly the desired accuracy of the glucose concentration determination.

The item of suitability information on the suitability of the mobile device 112 for the purpose of performing the analytical measurement, for example, may be Boolean or digital information. Specifically, the item of suitability information may indicate the mobile device as being "suited" or "unsuited" for the purpose of performing the analytical measurement. For example, in order to determine the item of suitability information, the number of pixels 132 in the x-direction of the predefined spatial extension 116 of the reference object 114 may be compared with the threshold value, e.g., the threshold value derived from a maximum tolerance of the glucose measurement. In case the number of pixels 132 of the predefined spatial extension 116 of the reference object 114 is smaller, than the minimum number of pixels 132 in the x-direction of the predefined spatial extension 116 of the reference object 114 defined by the threshold value, the mobile device 112 may be determined as being unsuited for the purpose of performing the analytical measurement.

The method 136 for evaluating the suitability of the mobile device 112 may further comprise step f) (method step 162) adjusting a scaling information of the mobile device 112 by using the at least one item of spatial resolution information. The scaling information of the mobile device 112 may specifically indicate a relationship between a distance in the image 124 taken by the mobile device 112 and the corresponding distance in the real world 128. The scaling information may, for example, be adjusted in accordance with the at least one item of spatial resolution of the mobile device 112 after the scaling information may be set to a default value when starting the method 136. The scaling information may refer to a minimum distance between the camera 122 and an item in front of the camera 122, necessary for obtaining a sharp image.

Figure 3:
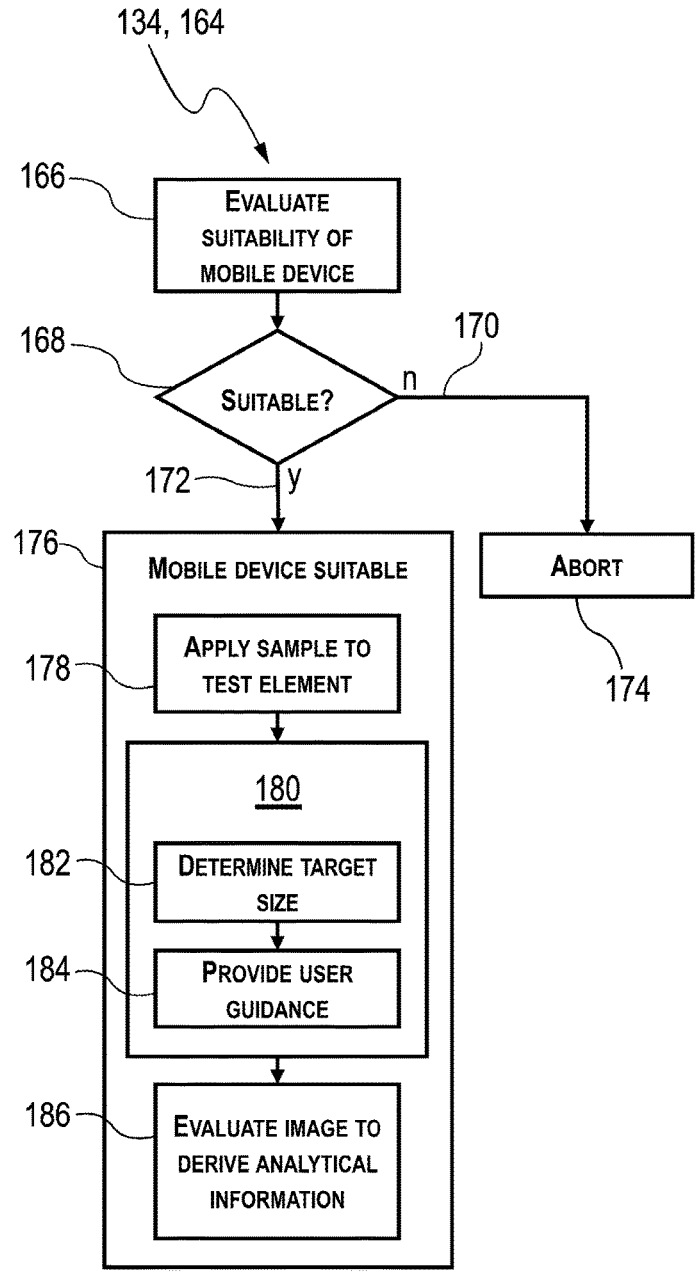
FIG. 3 shows a flow chart of a method for performing an analytical measurement.

The mobile device 112 may further be configured for performing at least one analytical measurement. A flow chart 134 of an embodiment of a method 164 for performing an analytical measurement is shown in FIG. 3. The method 164 for performing the analytical measurement may comprise a first step i) (method step 166) evaluating the suitability of the mobile device 112 by using the method 136 for evaluating the suitability of a mobile device 112. Specifically the suitability of the mobile device 112 may be evaluated by using the method 136 as described above.

Further, the method 164 may comprise a branching point 168. The branching point 168 may indicate a condition query, such as deciding between a first branch 170 and a second branch 172. For example, the condition query may make use of the item of suitability information. The item of suitability information may comprise Boolean information on the mobile device 112, such as "suited" ("y") or "unsuited" ("n"). The first branch 170 indicates the mobile device 112 being unsuited for performing the analytical measurement, thus the branch may lead to a second step ii) (method step 174) if the at least one item of spatial resolution information indicates the mobile device 112 being unsuited for performing the analytical measurement, aborting the method for performing the analytical measurement. Specifically, the blood glucose measurement may not be performed if the item of suitability information indicates the mobile device 112 being unsuited for performing the blood glucose measurement. More specifically, the blood glucose measurement may not be performed if the desired spatial resolution for determining the blood glucose concentration is not met by the mobile device 112 and/or the camera 122.

The second branch 172 indicates the mobile device 112 being suited for performing the analytical measurement. Thus, the second branch 172 may lead to performing the third step iii) (method step 176) if the at least one item of suitability information indicates the mobile device 112 being suited for performing the analytical measurement, performing the analytical measurement. Specifically, the blood glucose measurement may be performed if the item of suitability information indicates the mobile device 112 being suited for performing the blood glucose measurement. More specifically, the blood glucose measurement may only be performed if the desired accuracy for determining the blood glucose concentration is met by the camera 122 and/or the mobile device 112. For example, once the suitability of the mobile device 112 is determined, an arbitrary number of analytical measurements may be performed using the mobile device 112. Alternatively, however, the evaluation of the suitability of the mobile device 112, e.g., method 136, may be repeated, for example after predetermined or determinable intervals or in case any changes are made to the mobile device 112. Thus, step i) (method step 166) may be performed at least once before step iii) (method step 176) is performed at least once, or method step 166 may be performed at least once before method step 176 may be performed repeatedly. However, performing the analytical measurement by using the mobile device 112 according to method step 176 may comprise a plurality of partial steps.

The method step 176 may comprise a first partial step a) (method step 178) applying at least one sample to at least one test element 118 having at least one test chemical capable of a color formation reaction. Specifically, at least one sample of bodily fluid, for example blood, may be applied to at least one test element 118. The test element 118, as shown in FIG. 1, may comprise a test chemical 120 capable of the color formation reaction. In particular, the test chemical 120 may be capable of the color formation reaction correlating to an analyte concentration in the bodily fluid. For example, the test chemical 120 may be capable of the color formation reaction correlating to a glucose concentration within the blood applied to the test element 118.

The method step 176 may further comprise a second partial step b) (method step 180) taking at least one image of at least part of the test element by using the camera. Specifically, when taking the at least one image 124 of at least part of the test element 118, the outline 144, superimposed on the display 123 of the mobile device 112, as shown in FIGS. 4 and 5, may provide visual guidance for positioning the test element 118 relative to the camera 122 of the mobile device 112. Thus, guidance may be provided both in method step 142 (step c)) within the method 136 and in method step 180 within method 164. Accordingly, FIGS. 4 and 5, showing a mobile device 112 taking an image 124 may illustrate both method step 142 of method 136 and method step 180 of method 164.

Method step 180 (partial step b)) may comprise a plurality of substeps, such as two substeps. A first substep b1) (method step 182) may comprise determining a target size for the test element 118 or of a test field 156 of the test element 118 in the image 124. The target size may be, for example, a desired size of the test element 118 in the image 124. Further, a second substep b2) (method step 184) may comprise providing user guidance during taking the image 124 by superimposing a visual indicator representing the target size. Thus, specifically, the target size may be or may comprise the size of the outline 144 superimposed on the display 123 when taking the image 124 with the mobile device 112, as illustrated in FIGS. 4 and 5. The target size, e.g., the size of the outline 144, may specifically be determined by using the at least one item of spatial resolution information. More specifically, the size of the outline 144 superimposed on the display 123 may correspond to the capability of the camera 122 of resolving two or more items in the image 124. Thus, the size of the outline 144 superimposed on the display 123 may represent the necessary size of the object 154, e.g., of the test element 118, in the image 124, in order to fulfill the desired spatial resolution for performing the analytical measurement. The object 154 may be brought as close to the camera 122 as is technically feasible without losing sharpness of the image 124. In FIG. 4, the test element 118 may be positioned relative to the camera 122 of the mobile device 112 such that the outline 144, superimposed on the display 123, and the test element 118 are aligned within the image 124. For example, the test element 118 may be brought into a distance to the camera 122 of the mobile device for taking the image 124, such that the image is still sharp and the test element 118 is aligned with the outline 144, superimposed on the display 123. In FIG. 5, however, the test element 118 is not aligned with the outline 144 superimposed on the display 123. Thus, the distance between the test element 118 and the camera 122 may be varied in order to align the test element 118 and the outline 144. For example, in order to align the test element 118 and the outline 144, the test element 118 may be brought closer to the camera 122 of the mobile device 112.

Further, the method step 176 may comprise a third partial step c) (method step 186) comprising evaluating the image 124 and deriving at least one analytical information thereof. Specifically, the at least one analytical information may be or may comprise a concentration of the analyte within the sample, such as the blood glucose concentration within the blood, applied to the test element 118 comprising the test chemical 120 capable of the color formation reaction. The evaluation of the image 124 may comprise transforming the determined color coordinate of the test chemical 120 into a concentration of the analyte within the sample, by using a predetermined or determinable correlation between a color coordinate and the concentration. The correlation, for example, may be or may comprise a transformation function, a transformation table or a lookup table, determined empirically. The correlation may further, as an example, be stored in a storage device comprised by the mobile device 112 illustrated in FIG. 1. Specifically, the correlation may be stored in the storage device by a software, more specifically by an app. Further, the software and/or the app may be or be comprised by a computer program, including computer-executable instructions for performing both the method 136 and the method 164, as illustrated in the FIGS. 2 and 3. The program may be executed on a computer or computer network, specifically, the program may be executed on the processor 130 of the mobile device 112 comprising the camera 122.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

110 kit for performing an analytical measurement
112 mobile device
114 reference object
116 predefined spatial extension
117 test element container
118 test element
119 visual reference field
120 test chemical
122 camera
123 display
124 image
126 dimension
128 real world
130 processor
132 pixel
134 flow chart
136 method for evaluating the suitability of a mobile device
138 step a): providing the at least one mobile device having the at least one camera
140 step b): providing at least one reference object having at least one predefined spatial extension
142 step c): taking at least one image of at least part of the reference object
144 outline
146 step d): deriving the at least one item of spatial resolution information by using the image
148 substep d1): recognizing within the image the at least one reference object having the at least one predefined spatial extension in the at least one spatial dimension
150 sub step d2): determining a number of pixels of the object in the image in the at least one spatial dimension
152 region of interest
154 object
156 test field
158 substep d3): deriving the at least one item of spatial resolution information by using the number of pixels and the predefined spatial extension of the reference object in the at least one spatial dimension
160 step e): comparing the at least one item of spatial resolution with at least one threshold value
162 step f): adjusting a scaling information of the mobile device by using the at least one item of spatial resolution information
164 method for performing an analytical measurement
166 step i): evaluating the suitability of the mobile device
168 branching point
170 first branch
172 second branch
174 step ii): aborting the method 176 step iii): performing the analytical measurement
178 partial step a): applying at least one sample to at least one test element
180 Partial step b): taking at least one image of at least part of the test element by using the camera
182 substep b1): determining a target size for the test element or of a test field of the test element in the image
184 substep b2): providing user guidance during taking the image by superimposing a visual indicator representing the target size
186 partial step c): evaluating the image and deriving at least one analytical information thereof

What is claimed is:

1. A method for evaluating the suitability of a mobile device having a camera for performing an analytical measurement, the method comprising:
    a) providing the mobile device;
    b) providing a reference object having a predefined spatial extension in a spatial dimension;
    c) taking an image of at least part of the reference object using the camera;
    d) using the image to derive spatial resolution information that includes one or more numerical values that quantify the capability of the camera to resolve two or more objects in the image, wherein step d) further comprises
        recognizing the reference object within the image,
        determining a number of pixels of the reference object in the image in the spatial dimension, and
        deriving the spatial resolution information by using the determined number of pixels and the predefined spatial extension;
    e) providing a threshold value as a minimum number of pixels in the spatial dimension within a region of interest in the image;
    f) comparing the spatial resolution information with the threshold value; and
    g) determining from the comparison in step f) the suitability of the mobile device for performing the analytical measurement.

2. The method according to claim 1, further comprising adjusting scaling information of the mobile device by using the spatial resolution information.

3. The method according to claim 1, wherein step c) comprises providing visual guidance for a user for positioning the mobile device relative to the reference object.

4. The method according to claim 1, wherein the reference object is selected from the group consisting of a test element, a test element container, and a package for receiving at least one test element.

5. A method for performing an analytical measurement by using a mobile device having a camera, comprising:
    evaluating the suitability of the mobile device using the method according to claim 1; and
    when the spatial resolution information indicates the mobile device is unsuitable for performing the analytical measurement, aborting the method.

6. A method for performing an analytical measurement by using a mobile device having a camera, comprising:
    evaluating the suitability of the mobile device using the method according to claim 1; and
    when the spatial resolution information indicates the mobile device is suitable for performing the analytical measurement, performing the analytical measurement, comprising the following steps:
        applying a sample to a test element having a test chemical capable of a color formation reaction;
        taking an image of at least part of the test element using the camera; and
        evaluating the image and deriving analytical information therefrom.

7. A method for performing an analytical measurement by using a mobile device having a camera, comprising:
    (i) evaluating the suitability of the mobile device using the method according to claim 1; and
    (ii) when the spatial resolution information indicates the mobile device is suitable for performing the analytical measurement, performing the analytical measurement, comprising the following steps:
        applying a sample to a test element having a test chemical capable of a color formation reaction;
        taking an image of at least part of the test element using the camera;
        evaluating the image and deriving analytical information therefrom;
    wherein step (i) is performed at least once before step (ii) is performed.

8. A method for performing an analytical measurement by using a mobile device having a camera, comprising:
    evaluating the suitability of the mobile device using the method according to claim 1; and
    when the spatial resolution information indicates the mobile device is unsuitable for performing the analytical measurement, performing at least one of: informing a user of the unsuitability of the mobile device for performing the analytical measurement, blocking future attempts to perform the analytical measurement by using the mobile device, and transmitting information on the mobile device being unsuited for performing the analytical measurement.

9. A method for performing an analytical measurement by using a mobile device having a camera, comprising:
    (i) evaluating the suitability of the mobile device using the method according to claim 1; and
    (ii) when the spatial resolution information indicates the mobile device is suitable for performing the analytical measurement, performing the analytical measurement, comprising the following steps:
        applying a sample to a test element having a test chemical capable of a color formation reaction;
        taking an image of at least part of the test element using the camera, the taking of the image further comprising determining a target size for the test element or of a test field of the test element in the image and providing user guidance by superimposing a visual indicator representing the target size; and
        evaluating the image and deriving analytical information therefrom.

10. A non-transitory computer readable medium having stored thereon computer-executable instructions for performing the method according to claim 1.

11. A mobile device for performing an analytical measurement, the mobile device having a camera and being configured for performing a self-suitability evaluation by using the following steps:
    a) taking an image with the camera of at least part of a reference object having a predefined spatial extension in a spatial dimension;

b) using the image to derive spatial resolution information that includes one or more numerical values that quantify the capability of the camera to resolve two or more objects in the image, wherein step b) further comprises recognizing the reference object within the image, determining a number of pixels of the reference object in the image in the spatial dimension, and deriving the spatial resolution information by using the determined number of pixels and the predefined spatial extension;

c) providing a threshold value as a minimum number of pixels in the spatial dimension within a region of interest in the image;

d) comparing the spatial resolution information with the threshold value; and e) determining from the comparison the suitability of the mobile device for performing the analytical measurement.

12. The mobile device according to claim 11, the mobile device further being configured for performing at least one analytical measurement by using the following steps:
    evaluating the suitability of the mobile device based on the spatial resolution information; and
    when the spatial resolution information indicates the mobile device is unsuited for performing the analytical measurement, aborting the analytical measurement.

13. The mobile device according to claim 11, the mobile device further being configured for performing at least one analytical measurement by using the following steps:
    evaluating the suitability of the mobile device based on the spatial resolution information;
    when the spatial resolution information indicates the mobile device is suited for performing the analytical measurement, performing the analytical measurement, comprising the following steps:
        (i) taking an image of at least part of a test element by using the camera, the test element having at least one test chemical capable of a color formation reaction, the test element having applied thereto at least one sample;
        (ii) taking an image of at least part of the test element using the camera;
        (iii) evaluating the image and deriving analytical information therefrom.

14. A kit for performing an analytical measurement, the kit comprising:
    a mobile device according to claim 11;
    a reference object having a predefined spatial extension in a spatial dimension; and
    a test element having a test chemical capable of a color formation reaction.

* * * * *